United States Patent [19]
Bergeron et al.

[11] Patent Number: 4,922,514
[45] Date of Patent: May 1, 1990

[54] METHOD AND APPARATUS FOR DISPATCHING SERVICES

[75] Inventors: Lawrence E. Bergeron, Trumbull; John D. Goldson, West Haven; David A. Ellis, Wallingford, all of Conn.

[73] Assignee: Dictaphone Corporation, Stratford, Conn.

[21] Appl. No.: 290,403

[22] Filed: Dec. 29, 1988

[51] Int. Cl.$^5$ .......................................... H04M 11/00
[52] U.S. Cl. ........................................ 379/6; 379/49; 379/40; 379/45; 379/27
[58] Field of Search ...................... 379/32, 49, 39, 40, 379/41, 45, 6, 27

[56] References Cited

U.S. PATENT DOCUMENTS

4,652,859  3/1987  Van Wienen ..................... 379/40 X

Primary Examiner—Stafford D. Schreyer
Attorney, Agent, or Firm—Robert H. Whisker; David E. Pitchenik; Melvin J. Scolnick

[57] ABSTRACT

A method and system for the dispatch of resources to remote sites in response to alarm signals. A preferred embodiment particularly relates to a system for the dispatch of field service engineers to a plurality of remote sites in response to fault conditions detected in systems for the storage and retrieval of voice signals. A processor accesses a database of field service engineers designated to provide services to particular remote sites in response to alarm signals received from those sites and then attempts to establish a telephone connection with the field service engineer. Once communication is established, the processor provides the field service engineer with information by means of synthetic voice messages. In a preferred embodiment of the subject invention, the system may also execute remote diagnostic programs and where the results of the diagnostic programs are not within predetermined limits, the system will again attempt to contact a field service engineer.

45 Claims, 6 Drawing Sheets

METHOD AND APPARATUS FOR DISPATCHING SERVICES

BACKGROUND OF THE INVENTION

The subject invention relates to the dispatch of resources, and more particularly to the dispatch of field service engineers to remote sites.

The general problem of dispatching of resources can be broken down into three parts; the identification of locations requiring the resources, the proper selection of resources for assignment to the identified locations, and communication of the assignment to the selected resources. One solution to all of these aspects of the problem has been based on the use of "dispatchers"; individuals who receive request for service, typically over the telephone network, and dispatch resources to provide the requested services, typically using two-way radio communication. A typical example would be a dispatcher for a radio dispatched taxi fleet.

Systems have been developed which address portions of the problem discussed above. Thus, U.S. Pat. No. 3,694,579; to: McMurray; teaches a system for transmission of digital location codes and a signal identifying predetermined municipal services (e.g. fire, robbery, medical, etc.) to a plurality of relay receivers which in turn communicate with a data center for dispatch of the appropriate services (e.g. fire department to fires, police to robberies, etc.).

While possibly effective for its intended purpose, it should be noted that the McMurray reference is inherently limited to relatively small regions; both by the need for a large number of relay receivers distributed over the region to be serviced and, more importantly, by the need to have publicly available services such as police and fire. That is, McMurray provides at least a limited solution to the problems of identifying locations requiring services and communicating the need for services to the resources, but has only an extremely limited capability to select resources by sending the fire department to fires, the police department to robberies, etc.

Another approach to the problem of resource dispatch is taught in U.S. Pat. No. 4,492,820; to: Kennard et al. This patent teaches a local system attached to a user's telephone for transmitting a selected message to specified telephone numbers in response to manual, remote, or pre-timed automatic operation. The system of Kennard et al. too provides at least a partial solution to the problems of identifying locations requiring services and communicating that need to resources for providing those services, but is of only very limited use for selecting the appropriate resources for assignment. Thus, for example, if the emergency number for the police department were to be changed, it would be necessary for each user of a system as taught in Kennard et al. to individually change the specified telephone number. Further, in situations such as the dispatch of field service engineers to various remote cites, the system of Kennard et al. would be essentially unusable since the designation of various field service engineers to respond to request for services must be constantly adjusted to accommodate vacations, changes in personnel, etc. To achieve this with the system of Kennard et al. would require that the information stored at each location be separately updated.

The system of Kennard et al. is specifically taught as a replacement for another system (not further identified) wherein signals transmitted over the telephone network cause a computer to display an associated file, and a system operator will summon help after review of the file by calling up to three numbers.

In general, known systems for the dispatch of resources, while possibly effective for their intended purposes, do not adequately address the problem in the context of situations, particularly such as the dispatch of field service engineers, where different resources may be designated for different locations, either on the basis of geographic distribution of the sites, or on some other basis, and where the designated resources, and their priority for dispatch, may vary with time.

Thus, it is an object of the subject invention to provide a method and system for the dispatch of resources, and particularly field service engineers, to sites as needed.

It is a further object of the subject invention to provide such a method and system which is suitable for dispatch of resources to widely distributed remote sites.

BRIEF SUMMARY OF THE INVENTION

The above objects are achieved and the disadvantages of the prior art are overcome in accordance with the subject invention by means of a system which includes apparatus for receiving alarm signals, preferably over the telephone network, from remote sites, and a database of resources designated for each of the sites. (By database herein is meant a memory device, such as a random access memory, hard disk, etc., storing information relating to a particular subject.) The system also includes a controller which identifies a particular site in response to an alarm signal from that site, accesses the database to determine an ordered list of resources designated for that site, sequentially attempts to establish, in the order determined, communications with the resources designated for the site, and cyclically continues to attempt to establish communications until communications are established with one of the resources designated for the identified site, or until the occurrence of some other predetermined event.

In a preferred embodiment the subject invention further includes apparatus for reallocating the designations of the resources among the sites and for redefining the order for attempting to establish communications with the resources.

In another preferred embodiment the resources are field service engineers, and the system of the subject invention attempts to establish communication with the field service engineers over the telephone network by means of synthesized voice messages.

In still another preferred embodiment of the subject invention, the system includes apparatus for running a remote diagnostic program for a device located at one of the sites, and for determining if the results of the diagnostic program are within predetermined limits. If the results are not within these limits, the system will attempt to communicate with selected resources as described above.

In still another preferred embodiment of the subject invention, the devices at the remote locations are systems for the storage and retrieval of voice signals and the remote diagnostic test include controlling the devices to store an audio signal sequence in accordance with a predetermined script, retrieving the stored sequence, and comparing it with the script to verify the correction functioning and quality of storage and retrieval of voice signals for the systems.

The subject invention may be practiced in accordance with a method including the steps of determining the total of available resources, establishing a database designating, in a predetermined priority order, resources for providing services to each of a plurality of remote sites, responding to alarm signals received from one site to determine which resources are designated for that site, sequentially attempting to establish, in the predetermined priority order, communications with the resources designated for that site, and continuing to attempt to establish communications until communications are successfully established with one of the resources designated, or the operation is otherwise terminated.

In another embodiment of the subject invention, the method may include dispatching the resources in response to the results of remote diagnostic tests, as described above.

Thus, it may be seen that the subject invention advantageously achieves the above objects and overcomes the disadvantages of the prior art. Other objects and advantages of the subject invention will be readily apparent to those skilled in the art from consideration of the attached drawings, and of the detailed description set forth below.

DETAILED DESCRIPTION OF PREFERRED EMBODIMENTS

Figure 1:
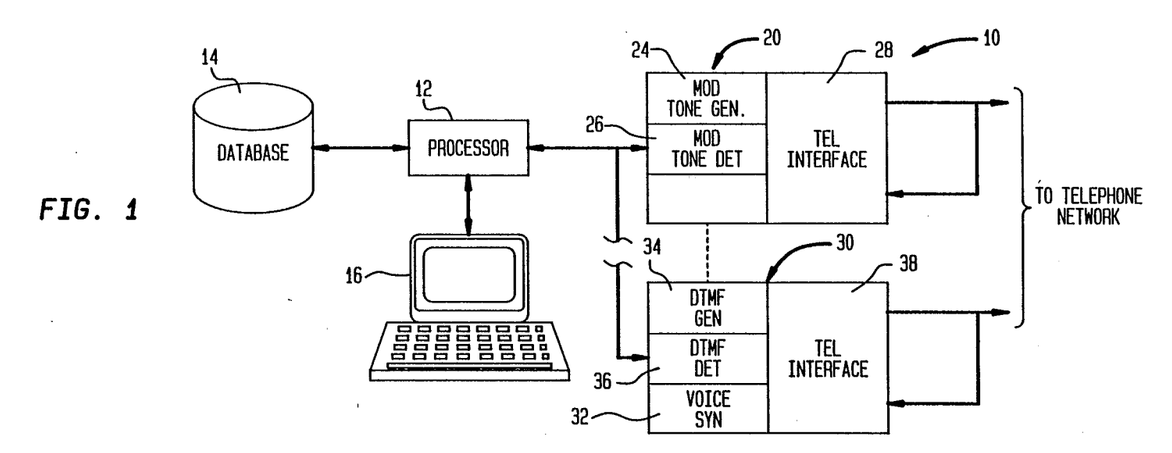
FIG. 1 shows a schematic block diagram of a system for the dispatch of, resources in accordance with the subject invention.

FIG. 1 shows a schematic block diagram of a system for dispatching field engineers to service systems for the storage and retrieval of voice files which are located at a plurality of remote sites. System 10 includes conventional processor 12, which may preferably be a known, commercially available microcomputer such as the PC/AT marketed by the IBM Corporation. Connected to processor 12 is a conventional database 14. Database 14 stores records comprising information for systems located at each of the remote sites. Each record is identified by an identification number for the corresponding system, and includes an ordered list of field service engineers assigned to provide service to that system. Associated with each field service engineer is an ordered list of telephone numbers to be used to contact the field service engineer. Also included in each record is information relating to the corresponding system, such as the name of a person to be contacted at the site, the site telephone number, service number, date installed, last service date, etc.

Also connected to processor 12 is an input/output device such as a conventional keyboard and display 16. Keyboard and display 16 may be used by a system operator to enter and update records in database 14 using conventional database management software, in a manner well known in the art. Thus, the operator may reassign the designations of field service engineers to provide services for various sites in the event of sickness or vacation, etc. In another embodiment of the subject invention, the records may be modified in accordance with a predetermined event driven or time driven schedule. For example, the order of the list of field service engineers designated for a particular site (i.e. the priority in which the engineers will be called) may be rearranged when one of the engineers receives an assignment to a different site and/or at the end of a shift. Such time or event driven updating of database records is well understood by those skilled in the art and need not be discussed further here for an understanding of the subject invention.

Processor 12 communicates with and receives alarm signals from systems at remote sites through one or more telephone ports 20. Port 20 includes a modified DTMF tone generator 24 and a modified tone detector 26 for the generation and detection of standard DTMF tones as well as the generation and detection of modified DTMF tones which are distinct from standard DTMF tones and are not recognized by the telephone network or other systems as control signals. These modified tones are used in remote diagnostic programs in a manner which will be described further below. Telephone port 20 also includes a standard telephone interface 28 for performing conventional telephone functions, such as line seizure and ring detection.

Processor 12 also communicates through telephone port 30 with field service engineers. Port 30 includes a conventional voice synthesizer 32 for communicating information to the field service engineers in response to alarm signals received from the remote sites, conventional DTMF generator 34 and DTMF detector 36, and a telephone interface 38, substantial identical to interface 28.

Though tone generators and detectors 24,26,34 and 36, as well as voice synthesizer 32 have been shown as dedicated to particular telephone ports for ease of illustration and description, those skilled in the art will recognize that these subsystems may be shared among telephone ports under control of processor 12 without significant change in the subject invention.

Figure 2:
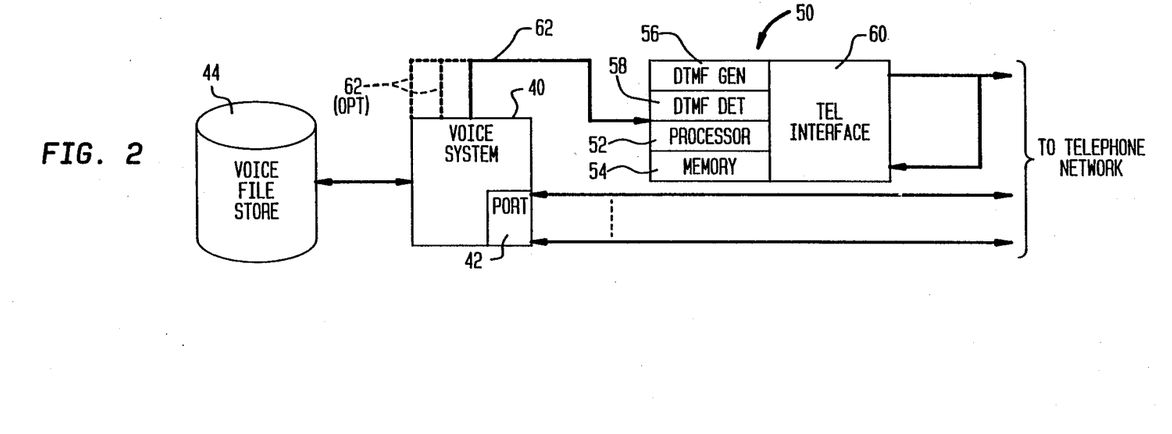
FIG. 2 shows a schematic block diagram of a system for the storage and retrieval of voice signals connected to an automatic dialer system for the transmission of alarm signals to the system of FIG. 1 in accordance with the subject invention.

FIG. 2 shows a conventional system for storage and retrieval of voice signals, together with an autodialer system for the generation and transmission of alarm signals to the system of FIG. 1. Voice system 40 is a conventional system such as the DX 7000 system marketed by the assignee of the present application, which may be used for applications such as voice mail or central dictation. The primary function of voice system 40 is to store voice signals for later retrieval. Such signals are received over a plurality of conventional telephone ports 42 and stored on a conventional mass storage device such as a hard disk 44. The operation of voice system 40 and similar systems is well known in the art, and further description is not believed necessary for an understanding of the subject invention except to note that such systems have capability to monitor their own hardware and software function to detect fault conditions. For example, voice system 40 will conventionally have the ability to monitor the signals and voice file storage 44 to detect parity errors and the ability to detect power supply voltages which are out of the nominal range. Conventionally, system 40 would then provide an indication to an operator of the fault condition so that the operator may determine whether or not a field service engineer should be called.

In accordance with one embodiment of the subject invention, an autodialer 50 is provided to automatically generate alarm signals to the dispatch system of FIG. 1. Autodialer 50 indicates a processor 52 for controlling the operation of autodialer 50, memory 54 for storing information such as the identification code for system 40, a telephone number to contact system 10, and the code to control processor 52. Autodialer 50 also includes conventional DTMF generator and detector 56 and 58 and telephone interface 60, which are substantially identical to the similar systems described above.

Autodialer 50 is connected to system 40 by line 62 to provide an indication of a system fault detected by system 40. When system 40 detects a fault condition, a signal is transmitted to autodialer 50 in a conventional manner, such as by closing a relay, and autodialer 50 responds by establishing a telephone connection with system 10 and transmitting a code which identifies system 40, as will be further described below. (Hereinafter indication of a fault condition to autodialer 50 will be referred to as "closure"). In another embodiment of the subject invention, distinction may be made between different types of faults by providing additional lines 62 (optional) for different fault types. In this embodiment, autodialer 50 would generate a different code in response to closure on different lines, with the code identifying the fault type system 40. Alternatively, a single line 62 may be provided and the fault identification provided on a separate channel.

Figure 3:
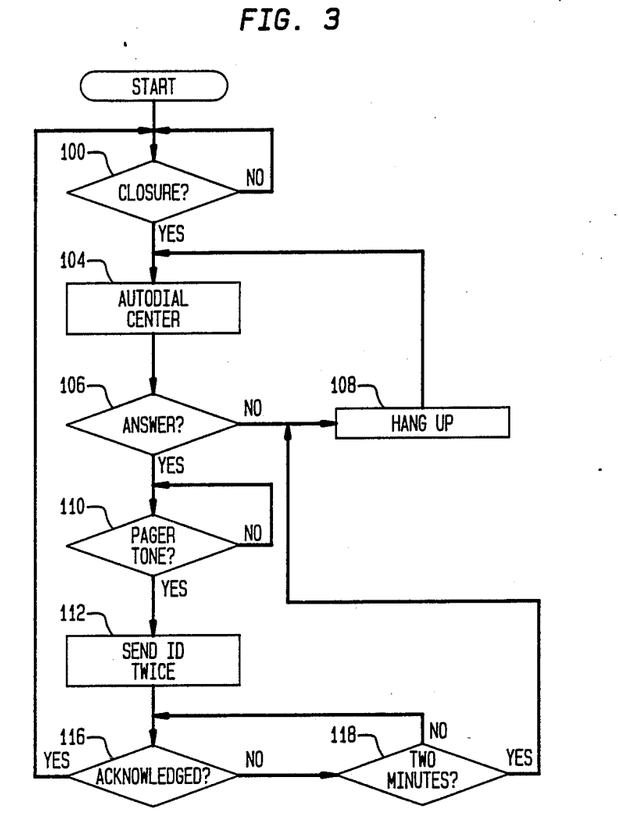
FIG. 3 shows a flow chart of the operation of the automatic dialer of FIG. 2.

FIG. 3 shows a flow chart of autodialer 50 under control of processor 52. At 100 autodialer 50 waits for closure. When a closure signal is received at 104, processor 52 controls DTMF generator 60 to autodial system 10 at the service dispatch center using the telephone number previously stored in memory 54. At 106, autodialer 50 determines if the call to system 10 has been acknowledged by an answer tone within a predetermined period. If no answer is detected, at 108 autodialer 50 will hang up and return to 104 through two minute delay 109 to dial again, and continue in this loop until an answer is received, or an operator intervenes. In another embodiment of the subject invention, processor 52 may be programmed to try another number in the event system 10 cannot be reached in a predetermined number of tries. Once the answer tone is received, at 112 autodialer 50 transmits an identification code using standard DTMF tones. Preferably this identification code is sent twice and followed by a termination code such as the pound code. At 116 autodialer 50 test to determine if the identification code has been acknowledged by system 10, preferably by the transmission of a predetermined DTMF tone. If the identification code has been acknowledged, autodialer 50 returns to its initial condition at 100, and if it has not been acknowledged, returns through 108 and 109 to hang-up and after two minutes autodial again at 104.

As noted above, in one embodiment of the subject invention, different closure signals may be provided for different fault conditions. In such an embodiment autodialer 50 would respond to each closure identically except that at 112 a different identification code, including information identifying the fault condition as well as system 40, would be sent.

Figure 4:
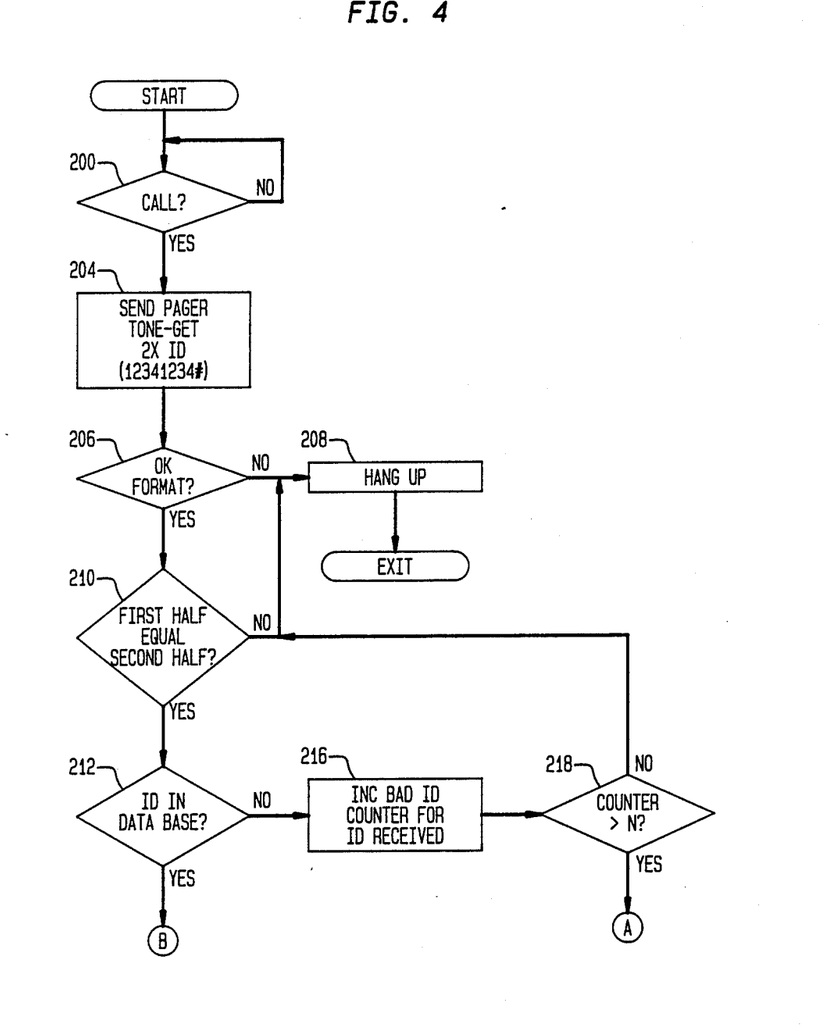
FIGS. 4-6 show a flow chart of the operation of the processor of the system of FIG. 1 operating in response to a received alarm signal.
Figure 5:
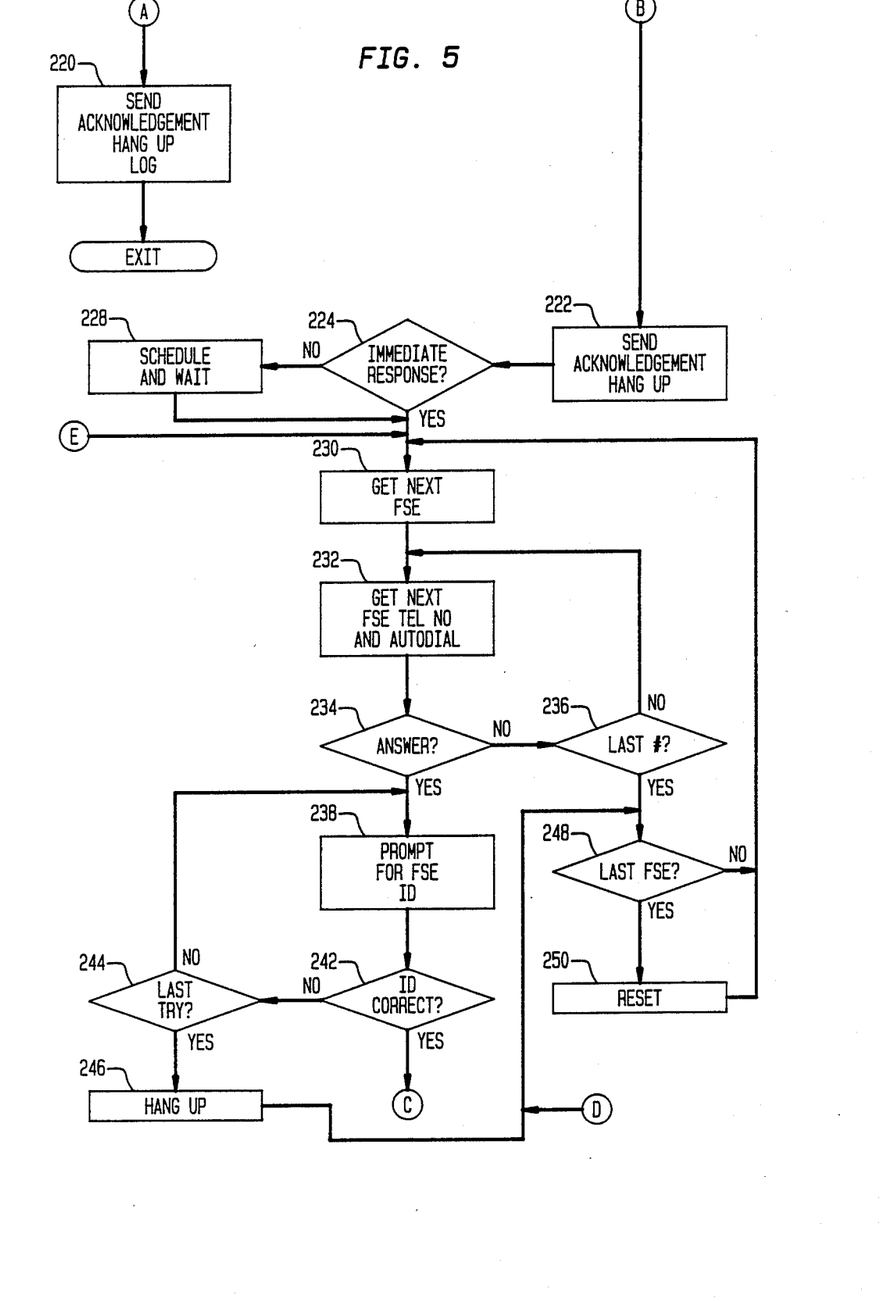
Figure 6:
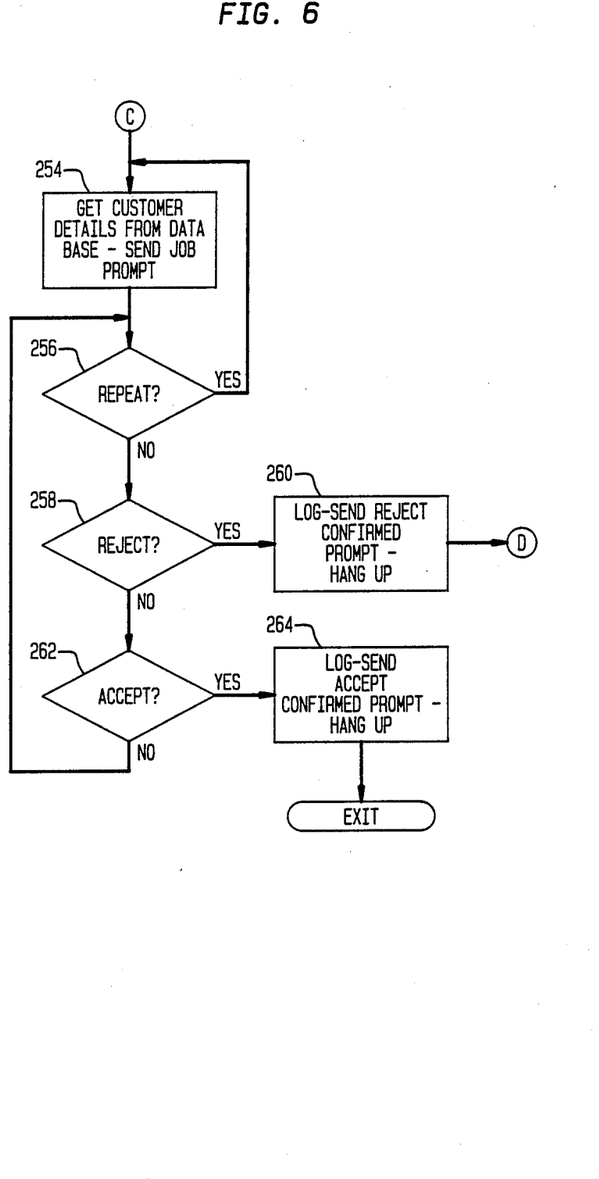

FIGS. 4, 5, and 6 show a flow chart of the operation of system 10 in response to an alarm signal received from autodialer 50. At 200 the system waits for a call. At 204 when a call is received, system 10 sends the answer tone and receives the double identification code. To avoid unnecessary dispatch of field service engineers, system 10 then tests the identification code. At 206 system 10 first tests to determine if the code has a proper format, e.g. is terminated by a pound tone. If it is not, at 208 system 10 hangs up the call and exits. If the format is correct, at 210 system 10 determines if the first half of the code equals the second half; that is, was the identification code sent twice. If not, again at 208 system 10 hangs up. If the identification code has been sent identically twice, at 212 system 10 determines if the identification code is in database 14. (Those skilled in the art will recognize that other embodiments of the subject invention may use other communication protocols and positive identification techniques without departing from the spirit of the subject invention.) If the code is not in database 14, at 216 system 10 increments the counter indicating how many times that identification code has been received, and hangs up at 208 and exits.

Returning to 212, if the identification code is in database 14, at 222 system 10 sends an acknowledgement to autodialer 50 and hangs up. Assuming that the identification code will identify more than one type of fault condition, at 224 system 10 determines if the fault condition requires an immediate response. If the fault condition does not require an immediate response, at 228 system 10 schedules the fault and waits. For example, a fault condition indicating that a power supply was out of normal tolerance might be scheduled for response during normal working hours while a fault condition indicating a power supply failure would require an immediate response.

Once a response is scheduled, at 230 system 10 accesses database 14 to determine the identification of the next field service engineer designated to provide service for system 40. Then, at 232 system 10 gets the next telephone number for that field service engineer and autodials that number. At 234 system 10 determine if the call has been answered. If it has not, at 236 system 10 determines if this is the last telephone number for that field service engineer. If not, system 10 returns to 232 to get the next telephone number for the field service engineer.

When the telephone is answered, at 238 system 10 prompts the person answering the call to enter an identification code for the field service engineer. The field service engineer then enters an identification code using standard DTMF tone signals, and at 242 system 10 determines if a correct identification code has been entered. If not, the system loops through 244 and 238 until the correct identification code is entered, or until at 244 the system determines that a predetermined number of attempts have been made or a predetermined time has elapsed. Then, at 246 the system hangs up and goes to 248. At 248, which is also reached if the system determines at 236 that the last telephone number for a field service engineer has been dialed, system 10 determines if this was the last field service engineer designated for voice system 40. If not, the system returns to 230 to get the identification for the next field service engineer. If it is, at 250, the system resets and returns to 230 to begin again with the first field service engineer.

System 10 continues to loop through 230 until a correct identification is entered by a field service engineer, or until an operator intervenes.

Once a field service engineer has properly entered his/her identification code, at 254 system 10 gets details about the customer from database 14. Typically, such details would include the address at which system 40 is located, a telephone number to call, or the name of a person to contact for more information. In one embodiment of the subject invention, the details may also include information about the type of fault condition which triggered the alarm signal. This information is then linked to predetermined phrases to form a job prompt and transmitted to the field service engineer over the telephone network as a synthetic voice message generated by voice synthesizer 32 from information contained in database 14. Preferably, the job prompt will include instructions to the field service engineer to enter preselected DTMF codes to indicate whether the prompt should be repeated, the engineer accepts the job, or the engineer rejects the job. At 256 the system then determines if the field service engineer has entered a request for the prompt to be repeated, and if so, loops through 254. If not, at 258 the system determines if the field service engineer has rejected the job. As indicated above, the engineer may reject the job by entering a predetermined DTMF tone, or in other embodiments of the subject invention, by failure to enter a response within a predetermined period of time. If the field service engineer rejects the job, at 260 system 10 logs the rejection and sends a rejection confirmed prompt and hangs up and returns to 248 (in FIG. 5) to determine the next field service engineer to be called. In one embodiment of the subject invention, the identification code for a field service engineer who rejects a job may be flagged so that engineer will not be called again on that job. At 262 if system 10 determines that the field service engineer has entered a code to accept a job, then at 264 the system logs the acceptance and sends the accept confirmed prompt and hangs up and exits. Overall, the system loops through 256,258 and 262 until the job has been either rejected, either explicitly or because the time allowed has elapsed, or has been accepted.

In a preferred embodiment of the subject invention an operator may use keyboard and display 16 to generate and retrieve reports based upon the information logged with respect to alarm signals received, as well as the acceptance/rejection ratio of the field service engineers who are contacted. Reports are generated using conventional database management techniques. These reports may be used to obtain failure statistics for system 40, as well as a performance measure for the field service engineer and/or for billing of field engineering services.

While voice system 40 has, as discussed above capabilities for monitoring internal fault conditions, other conditions exist which cannot be easily detected by system 40. For example, a failure in one of ports 42 may prevent input of audio signals or may degrade the signal received to the point where it cannot be understood. Yet, such a fault may not be detectable by self test programs run by system 40. Also, because ports 42 are connected to the telephone network, failure of equipment in the telephone network, or in customer provided equipment such as PBX's may block access to system 40. Accordingly, in a preferred embodiment of the subject invention, system 10 has the capability to run remote diagnostic programs to test and determine accessibility, as well as the quality of voice messages stored and retrieved by voice system 40.

Figure 7:
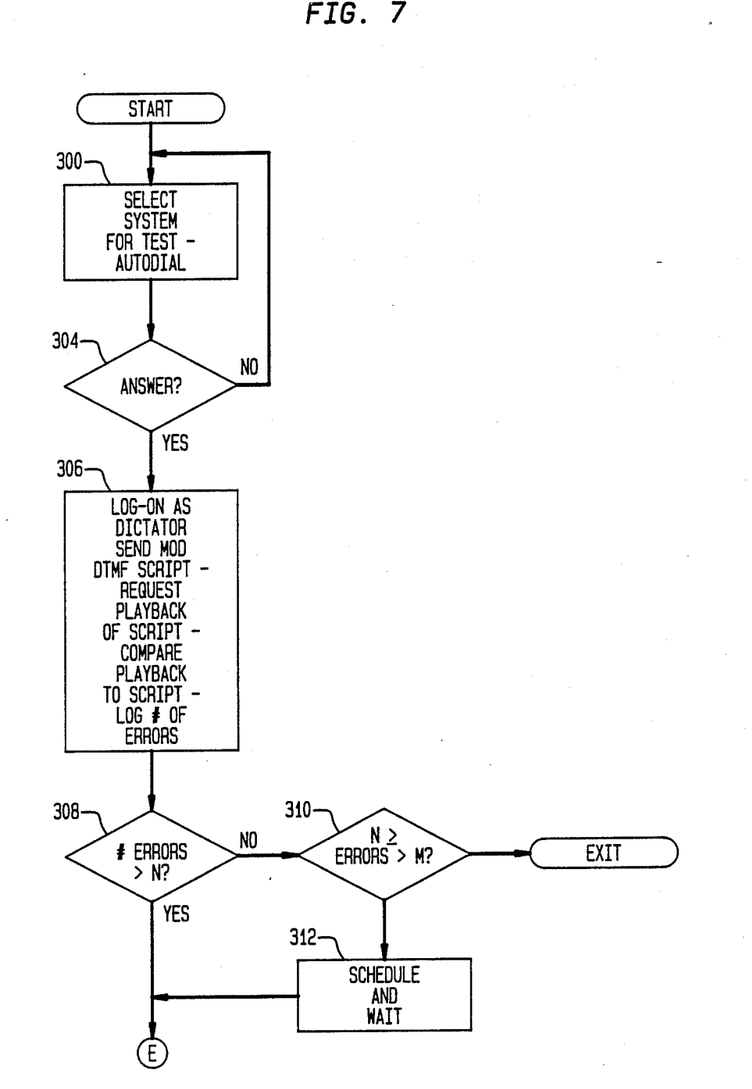
FIG. 7 shows a flow chart of the operation of the processor of the system of FIG. 1 in running a remote diagnostic program.

In FIG. 7 at 300 system 10 selects system 40 for test and autodials a predetermined number to establish a telephone link with system 40 through ports 42. At 304, system 10 determines if the call has been answered, and if not, hangs up and loops through 300; continuing until the call is answered or an operator intervenes, or a predetermined number of attempts have been made. When the call is answered, system 10 then generates standard DTMF tones to log-on as a voice system 40 user (i.e. an originator of voice signals for storage) and then transmits a predetermined sequence of modified DTMF tones to system 40. These modified DTMF tones are generated in a substantially identical manner to standard DTMF tones, but are generated using a center frequency shifted control clock signal selected to be different from the standard DTMF tones clock signal, and which will not be recognized as control signals by either the telephone network or system 40.

The modified tones generated by tone generator 24 are recorded in a conventional manner by system 40 on voice file storage system 44 in a conventional manner. System 10 then uses further standard DTMF tones to request system 40 to playback the voice file just recorded. The tones are identified by the modified tone detector 26 and compared to the predetermined script and the number of errors, if any, detected is logged. (If there is a minor fault in the recording/playback, such as a slight degradation of front and equipment or minor disk errors, the modified DTMF as played back will have slightly different characteristics which will be detected by detector and may be logged to monitor degradation of system performance.)

Tone generator 24 and tone detector 26 operate by conventional digital signal processing techniques which need but be discussed further here for an understanding of the subject invention, accept to note that the DTMF signal frequencies are determined by the center frequency of the control clock signal. In a preferred embodiment of the subject invention the center frequency of control clock generator 27 may be shifted under program control.

Each DTMF signal pair is shifted in frequency an amount related to the shift in the control clock signal. Since clock generator 27 is under program control, both standard and modified DTMF signals may be generated and detected. Hence, standard DTMF signals may use to control system 40, and modified DTMF signals recorded using the same generator and detector.

Then at 308 system 10 determines if the number of errors detected exceeds a predetermined number, N, and, if it does, returns to 230, FIG. 5, to dispatch a the field service engineer designated to provide service to system 40. At 310 system 10 determines if the number of errors is less than or equal to N but greater than M, that is is greater enough to warrant attention but not to require immediate dispatch of a field service engineer, and, if so, at 312 schedules the job and waits, and then returns to 230 to dispatch a field service engineer for system 40. If the number of errors is less than M, the system exits.

If access to system 40 is blocked due to failure of equipment in the telephone network, these blocked (busy) calls are also logged as errors.

The preferred embodiments described above and illustrated in the attached drawings have been provided by way of illustration only, and numerous other embodiments of the subject invention will be apparent to those skilled in the arts from consideration of the above description and the attached drawings. Particularly, it will be apparent that while the above description has been given in terms of a single voice system, and a single alarm signal, it is well within the ability of those skilled in the art to program processor 12 to handle multiple alarm signals received from multiple systems at remote locations concurrently. Also, while the above description has been given in terms of system failure or degradation, it is also within the contemplation of the subject invention to provide other services. Thus, remote systems could be programmed to request periodic preventive maintenance. Or, the system could be programmed to indicate that it was approaching maximum utilization and a salesperson notified of the possibility to sell an upgrade. Accordingly, limitations on the subject invention are to be found only in the claims set forth below.

What is claimed is:

1. A system for dispatching services, comprising:
   (a) means for receiving alarm signals from a plurality of remote sites;
   (b) a database of resources for providing said services designated for each of said sites;
   (c) control means responsive to said receiving means for:
      (c1) identifying a particular site in response to an alarm signal from said particular site;
      (c2) accessing said database to determine an ordered list of resources designated for said particular site;
      (c3) sequentially attempting to establish, in said order, communications with said resources designated for said particular site;
      (c4) cyclically repeating step (c3) until communications are established with one of said resources designated for said particular site, or until operation is otherwise terminated.

2. A system as described in claim 1 further comprising means for reallocating the designations of said resources among said sites and for redefining said order for attempting to establish communications.

3. A system as described in claim 2 wherein said reallocation of designations is predetermined and is carried out in accordance with a predetermined schedule.

4. A system as described in claim 2 wherein said redefinition of said order is predetermined and is carried out in accordance with a predetermined schedule.

5. A system as described in claim 1 wherein said alarm signals represent failures or degradation of operation of equipment located at said remote sites and said resources include service personnel.

6. A system as described in claim 5 wherein said control means establishes communication with said service personnel through the telephone network and communicates with said service personnel by means of synthesized voice messages.

7. A system as described in claim 5 wherein said service personnel respond to communications from said control means by generating telephone signals, such as DTMF tones, to accept or reject assignment.

8. A system as described in claim 7 wherein said service personnel respond to communications from said control means by transmitting their identification code using telephone signals.

9. A system as described in claim 1 wherein said control means communicates with said resources over the telephone network.

10. A system as described in claim 1 wherein said alarm signals comprise additional information identifying the nature of the occurrence which caused said alarm signal, and wherein said control means classifies said alarm signals in accordance with said additional information.

11. A system as described in claim 10 wherein said control means communicates said additional information to said resource with which communications are established.

12. A system as described in claim 10 wherein said control means defers step (c3) in response to alarm signals which are classified into predetermined low priority classifications.

13. A system as described in claim 1 wherein said control means is further for:
   (c5) running a remote diagnostic program for a device located at a selected one of said sites;
   (c6) determining if the results of said diagnostic program are within predetermined limits; and,
   (c7) if said results are not within said limits executing steps (c3) and (c4).

14. A system as described in claim 13 wherein said control means further classifies the results of said remote diagnostic program.

15. A system as described in claim 14 wherein said control means communicates the results of said further classification to said resource with which communications are established.

16. A system as described in claim 14 wherein said control means defers execution of steps (c3) and (c4) in accordance with said further classification.

17. A system as described in claim 13 wherein said device comprises means for storage and retrieval of audio signals, and wherein said diagnostic program comprises the steps of:
   (a) controlling said storage and retrieval means to store audio signals;
   (b) generating and transmitting to said storage and retrieval means an audio signal sequence in accordance with a predetermined script for storage;
   (c) controlling said storage and retrieval means to retrieve said stored sequence and transmit said sequence to said control means;
   (d) comparing said retrieved sequence with said script and determining the number of errors.

18. A system as described in claim 17 wherein said sequence comprises a sequence of tones in the audio frequency range.

19. A system as described in claim 18 wherein said tones are DTMF tones modified so as not to interfere with standard DTMF tones used as telephone signals.

20. A system as described in claim 1 further comprising an autodialer means responsive to a fault indication signals from a device located at one of said remote sites for generating at least some of said alarm signals.

21. A system as described in claim 20 wherein said receiving means comprises a telephone port responsive to telephone signals transmitted over the telephone network and said autodialer means generates said alarm signals by first establishing a telephone connection with said telephone port and then transmitting an identification code to said control means.

22. A system as described in claim 21 wherein said identification code includes additional information indicating the type of fault in said device.

23. A system as described in claim 1 wherein said system further comprises means for:
(a) maintaining a second database of events, including occurrence of alarm signals and responses of said resources; and,
(b) generating reports from said second database; whereby said system may be used to generate statistics relating to things such as the occurrence of alarm conditions at said remote sites and the utilization of said resources, or to bill for the use of said resources.

24. A system for dispatching services, comprising:
(a) a database of resources designated for providing services for each of a plurality of remote sites,
(b) control means for:
  (b1) running a remote diagnostic program for a device located at one of said remote sites;
  (b2) determining if the results of said program are within predetermined acceptable limits; and if said results are not within said limits,
  (b3) accessing said database to determine an ordered list of resources designated for said one site;
  (b4) sequentially attempting to establish, in said order, communications with said resources designated for said one site,
  (b5) cyclically repeating step (b4) until communications are established with one of said resources designated for said one site, or operation is otherwise terminated.

25. A system as described in claim 24 further comprising means for reallocating the designations of said resources among said sites and for redefining said order for attempting to establish communications.

26. A system as described in claim 24 wherein said resources are service personnel.

27. A system as described in claim 26 wherein said control means establishes communication with said service personnel through the telephone network and communicates with said service personnel by means of synthesized voice messages.

28. A system as described in claim 25 wherein said control means further classifies the results of said remote diagnostic program.

29. A system as described in claim 28 wherein said control means communicates the results of said further classification to said resource with which communications are established.

30. A system as described in claim 28 wherein said control means defers execution of steps (c3) and (c4) in accordance with said further classification.

31. A system as described in claim 24 wherein said device comprises means for storage and retrieval of audio signals, and wherein said diagnostic program comprises the steps of:
(a) controlling said storage and retrieval means to store audio signals;
(b) generating and transmitting to said storage and retrieval means an audio signal sequence in accordance with a predetermined scrip for storage;
(c) controlling said storage and retrieval means to retrieve said stored sequence and transmit said sequence to said control means;
(d) comparing said retrieval sequence with said script and determining the number of errors.

32. A system as described in claim 31 wherein said sequence comprises a sequence of tones in the audio frequency range.

33. A system as described in claim 32 wherein said tones are DTMF tones modified so as not to interfere with standard DTMF tones used as telephone signals.

34. A system as described in claim 24 wherein said system further comprises means for:
(a) maintaining a second database of events, including occurrence of alarm signals and responses of said resources; and,
(b) generating reports from said second database; whereby said system may be used to generate statistics relating to things such as the occurrence of alarm conditions at said remote sites and the utilization of said resources, or to bill for the use of said resources.

35. A method for dispatching resources for providing services to a plurality of remote sites comprising the steps of:
(a) determining the total of available resources;
(b) establishing a database designating, in a predetermined priority order, resources for providing service to each of said remote sites;
(c) responding to alarm signals received from one of said remote sites to determine which of said resources are designated for said one site;
(d) sequentially attempting to establish, in said order, communications with said resources designated for said one site; and,
(e) repeating step (d) until communications are successfully established with one of said resources designated for said one site, or until operation is otherwise terminated in response to a predetermined event.

36. A method as described in claim 35 wherein said alarm signals represent failures or degradation of operation of equipment located at said remote sites and said resources include service personnel.

37. A method for dispatching resources for providing services to a plurality of remote sites comprising:
(a) determining the total of available resources;
(b) establishing a database designating, in predetermined priority order, resources for providing service to each of said remote sites:
(c) running a remote diagnostic program for a device located at one of said remote sites;
(d) determining if the results of said program are within predetermined acceptable limits; and if said results are not within said limits;
(e) sequentially attempting to establish communications, in said order, with said resources designated for said one site;
(f) cyclically repeating step (e) until communications are established with one of said resources designated for said one site, or operations, are otherwise terminated.

38. A method as described in claim 37 wherein said resources are service personnel.

39. A method as described in claim 37 wherein said device comprises means for storage and retrieval of audio signals, and wherein said diagnostic program comprises the steps of:
(a) controlling said storage and retrieval means to store audio signals;
(b) generating and transmitting to said storage and retrieval means an audio signal sequence in accordance with a predetermined script for storage;

(c) controlling said storage and retrieval means to retrieve said stored sequence and transmit said sequence to said control means;

(d) comparing said retrieval sequence with said script and determining the number of errors.

40. A method as described in claim 39 wherein said sequence comprises a sequence of tones in the audio frequency range.

41. A method as described in claim 40 wherein said tones are DTMF tones modified so as not to interfere with standard DTMF tones used as telephone signals.

42. A method as described in claim 39 wherein said diagnostic program comprises the further step of comparing the characteristics of tones comprising said retrieved sequence with the characteristics of corresponding tones generated for said audio signal sequence transmitted to said storage and retrieval means, whereby degradation of operation of said storage and retrieval means may be detected.

43. A method of testing a system for storage and retrieval of audio signals comprising the steps of:

(a) inputting first DTMF signals to said system to access said system for storage of audio signals;

(b) inputting a predetermined audio signal to said system for storage, said predetermined audio signal comprising a predetermined sequence of modified DTMF tone;

(c) inputting second DTMF tone to said system to access said system to retrieve said audio signal stored in step (b); and (d) comparing said audio signal retrieved in step (d) with said predetermined sequence of modified DTMF tones.

44. A method as described in claim 43 wherein said DTMF tones are generated by conventional digital signal processing techniques, where the frequencies of each pair of signals comprised in said DTMF tones are determined in accordance with the center frequency of a control clock signal, and wherein said modified DTMF signals are generated by shifting said center frequency.

45. A method as described in claim 43 comprising the further step of comparing the characteristics of tones comprising said audio signal retrieved in step (c) with the characteristics of corresponding tones comprising said audio signal input in step (b), whereby degradation of operation of said storage and retrieval system may be detected.

* * * * *